Aug. 30, 1960  G. B. FOSTER ET AL  2,951,161
CASCADE STANDARDIZATION

Filed May 31, 1957  4 Sheets-Sheet 1

INVENTORS
GEORGE B. FOSTER
WILLIAM R. CLORE
By Anthony D. Cennamo

Aug. 30, 1960

G. B. FOSTER ET AL 2,951,161

CASCADE STANDARDIZATION

Filed May 31, 1957

INVENTORS
GEORGE B. FOSTER
WILLIAM R. CLORE

By Anthony D. Cennamo

Aug. 30, 1960  G. B. FOSTER ET AL  2,951,161
CASCADE STANDARDIZATION
Filed May 31, 1957  4 Sheets-Sheet 3
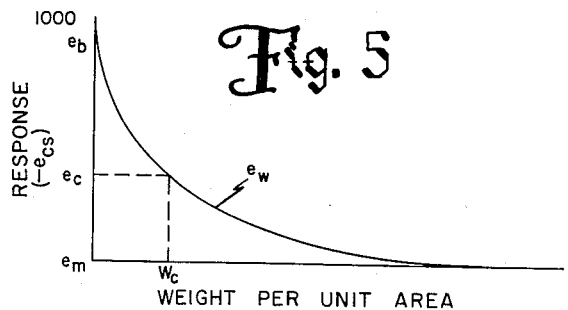
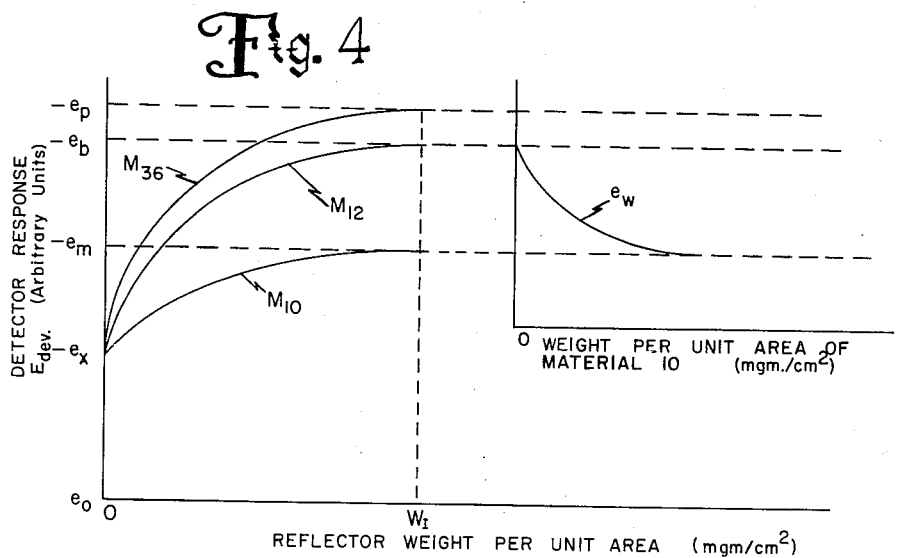
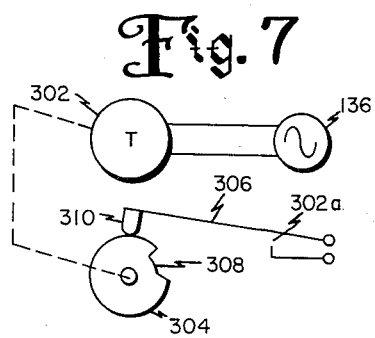
INVENTORS
GEORGE B. FOSTER
WILLIAM R. CLORE
By Anthony D. Cennamo INVENTORS
GEORGE B. FOSTER
WILLIAM R. CLORE
By Anthony D. Cennamo

2,951,161
CASCADE STANDARDIZATION

George B. Foster, Worthington, and William R. Clore, Columbus, Ohio, assignors to Industrial Nucleonics Corporation Filed May 31, 1957, Ser. No. 662,672

7 Claims. (Cl. 250—83.3)

This invention relates generally to a standardization method and apparatus for maintaining the accuracy of an electrical instrument used to measure a variable quantity in relation to some primary standard which is ordinarily available only infrequently or at chance intervals, and more specifically it relates to a novel cascade standardization method and apparatus whereby routine standardization of the instrument is effected through the use of a secondary standard whose value is correlated with that of the primary standard at such times as the latter may become available.

The practice of the present invention will be illustrated and described in connection with semi-automatic or completely automatic means for effecting all adjustments required to consummate standardization in accordance with the method herein disclosed. The utility of the invention will be demonstrated by a specific embodiment thereof incorporated in a reflection type of nuclear radiation gauge for measuring the physical properties of a material in connection with a continuous industrial process. It will be understood, however, that such a description and illustration is given by way of example only, and is not to be considered restrictive to the scope of the invention, inasmuch as a great many other uses and different embodiments thereof are possible and will in general become obvious to one working in any branch of the measurement art wherever there exists a need for such a method of standardization.

In accordance with a preferred embodiment of this invention, the general principle of a conventional servo-operated slidewire potentiometer rebalancing type of measuring system is adapted to provide indication and recording of any variable quantity translatable into electrical voltage values. In order to preserve the accuracy of the instrument, an occasional or periodic cycle of standardization is carried out at intervals. During standardization, certain adjustments to the measuring circuitry are performed in order to compensate for variable factors such as changes in the conditions of measurement or in the operating characteristics of electronic components within the instrument. Such routine standardization is usually carried out automatically and with reference to a secondary standard, which most commonly comprises a "standard cell" battery or other reference voltage source. While this conventional practice is adequate to compensate for the usual drifts or changes in the apparatus for measuring the electrical signal representing the measured quantity, it does not compensate for any error-producing changes which may occur in the transducer apparatus which originally translates the value of the measured quantity into a proportional electrical signal. Obviously if the transducer characteristics are subject to change, it becomes necessary to present to the transducer at least one known value of the measured quantity and to re-correlate the changed output of the transducer with the voltage of the standard cell or other comparison standard of reference. Such procedure usually involves a recalibration of the instrument with its attendant cost in labor and lost measuring time, whereas in view of the teachings of the present invention it may become a mere phase of standardization which can be quickly carried out by a simple and positive manual adjustment or by completely automatic means.

In view of the above remarks, the general method of practicing this invention will become apparent on following the detailed explanation of one particular apparatus embodying specific means for effecting standardization by the cascade method herein described.

There are many applications in the continuous process industries for a gauge which measures material properties by subjecting the material to a penetrative radiation, herein exemplified as beta radiation, such as is emitted from a nuclear radiation source and detecting certain characteristics of the primary or secondary radiations reflected or "backscattered" from the material. In the simplest example, involving the continuous weight per unit area (thickness) measurement of a traveling paper or plastic sheet, an inspection head comprising a radiation source and detector may be positioned near a drier or calender roll or other support means over which the sheet travels. Radiation from the source may penetrate the sheet and be reflected from the roll or other support means (referred to as the "backer") back through the sheet again so as to impinge upon the detector. The sheet itself may also reflect some radiation directly into the detector. In this case the ability to measure sheet thickness (in terms of weight per unit area) depends on the difference between the radiation reflection characteristics of the different materials in the backer and the measured sheet. Thus if there is no sheet present, the detector observes unmodified reflected radiation from the roll or other backer and produces a response correlatable with zero thickness of the sheet material. With increasing thickness of the sheet over the backer, the radiation reflected into the detector is more and more modified until at some generally indeterminate thickness referred to as an "infinite thickness" the detector receives substantially no radiation from the backer but instead responds to radiation reflected from the sheet alone. Between these limits the output of the detector exhibits a range of response values correlatable with the thickness of the sheet in any desired units of measurement. Assuming that the geometry of the inspection head and its relationship to the backer remains constant or suitably compensated, there is a definite relationship between the response from the bare backer, the response from an infinite thickness of the sheet, and all intermediate values of sheet thickness; which can be re-established by standardization against the response from the bare backer. However, in the industrial plant the process is normally in continuous operation and there is a constant flow of material over the backer in an uninterrupted stream, so that it is only at very infrequent intervals that the working surface of the backer is exposed. Furthermore, in a case where paper or plastic, for example, is being measured over a roll, it is insufficient, even in the rare cases where space is available and other factors might permit, to extend the length of the roll so that standardization can take place over the unused portion of the roll surface, for while the working surface is kept clean and polished by the sheet passing over it, the unused portion of the roll surface may rust and thereby change its reflection characteristics. Normally, upon installation of the gauge, the surface of the roll must be painstakingly conditioned by sanding or other process to obtain uniform radiation reflectivity along its entire length and periphery, since it is found that the backscatter indication is very sensitive to the surface condition of the roll. The initial surface condition so obtained, however, gradually changes as the roll is worn and polished by the sheet passing thereover. Such wear and polishing does not of course occur on the unused portion of the roll. Therefore, even if it were possible to keep the surface of the unused roll portion in the original condition, such condition does not long remain the same as that of the working surface, which is per se subject to change.

Furthermore, in normal operation the traveling sheet may continuously supply heat to, or extract heat from, the portion of the roll over which it passes, whereas such heat exchange does not occur on an unused roll portion. There is thus a temperature differential with its attendant normal differential roll expansion between the used and unused portions. This expansion affects the circumference of the roll and consequently the air gap separating the inspection head from the roll surface. Since the intensity of both the incident and the reflected radiation varies exponentially with the air gap distance, and for other reasons, it is found that the gauge indication is very sensitive to such temperature differential. It is clear that the opportunity for standardization over a truly normal backer must often be carefully chosen to reproduce as nearly as possible all conditions of temperature, air circulation and dynamic factors involved in actual production. Hence any procedure requiring exposure of the normal backer is generally unfeasible for the routine standardization which is required at relatively frequent intervals.

Similar problems are obviously multiplied in the measurement of zinc or tin plated strip, resin or plastic coated base sheets and the like. In the case of tin plate, for example, the normal backer is the base steel strip, on which the measured tin coat is applied, rather than the roll over which the plated strip passes. The roll is generally constructed of malleable cast iron. Because of the difference in chemical composition of the strip steel and the cast iron, the radiation reflection characteristics are different. Therefore the primary standard must be a section of steel strip deliberately left unplated and run over the roll under otherwise normal conditions, regular tin plate production having to be suspended meanwhile with obvious economic loss to the tin plate producer. It is again apparent that such procedure is generally unfeasible for frequent routine standardization required.

In accordance with a preferred embodiment of the cascade standardization method of this invention, a "standardizing plate" or "standard surface" is employed for periodic standardization rather than the normal backer or working surface. By manual or automatic means, the inspection head is positioned over the standard surface so that a useful intensity of radiation is reflected into the detector with the exclusion of radiation reflected from the working surface or the measured sheet. The standard surface should have stable reflective characteristics and should be constructed of a material permitting easy and effective cleaning by manual or automatic means. Although desirable, it is not a requirement that the reflective characteristics of the standard surface be the same as those of the working surface.

In the basic procedure of cascade standardization as applied to this type of apparatus, the instrument is initially standardized with the inspection head positioned over the normalized working surface. The head is then immediately positioned over the standard surface to determine the relationship between the reflectivity of the working surface and that of the standard surface. This relationship may be manually or automatically set up in the measuring circuits of the instrument so that standardization can take place using only the standard surface; the reflectivity comparison needing to be repeated only at infrequent intervals when it is convenient and appropriate to do so. In the preferred embodiment of the invention herein illustrated, the servo rebalancing instrument employed for measurement is designed to permit fully automatic implementation of the reflectivity comparison as well as the measurement and periodic standardization functions.

It is the general object of this invention to provide a method and means for maintaining the accuracy of an electrical instrument adapted to measure a variable quantity in terms of electrical values subject to datum displacement relative to a primary standard which is infrequently and aperiodically available.

It is also an object to provide a method and means whereby an instrument of the type described can be standardized periodically and as frequently as necessary to maintain full accuracy without requiring constant or frequent accessibility of the primary standard.

It is a further object to provide a method and means whereby an instrument of the type described can be compensated for error producing variables through the use of a secondary reference standard despite changes which may occur in the mutual relationship between the secondary standard and the primary standard.

It is a still further object to provide measuring circuitry capable of maintaining an established parameter interrelating the output of a transducer responsive to a variable characteristic, the value of a reference standard, and at least one known value of said characteristic.

It is another object to provide an instrument of the type described incorporating apparatus for automatically compensating the same in accordance with the objects above set forth.

It is still another object to provide a new and improved method and means for standardizing a nuclear radiation gauge of the reflection type.

It is an additional object to provide fully automatic means for cascade standardization of a reflection type nuclear radiation gauge.

Further objects and advantages of the present invention will become apparent in the following specification and appended drawings in which:

Figure 4 is a set of representative graphical plots relating detector response to various homogeneous and composite reflectors, illustrating the requirements of the circuits of Figure 2.

Figure 5 is an isolated curve from Figure 4 as it is adapted to the calibration of the instrument.

Figure 7 shows the circuits of a timing device used to initiate periodic standardization.

Figure 1:
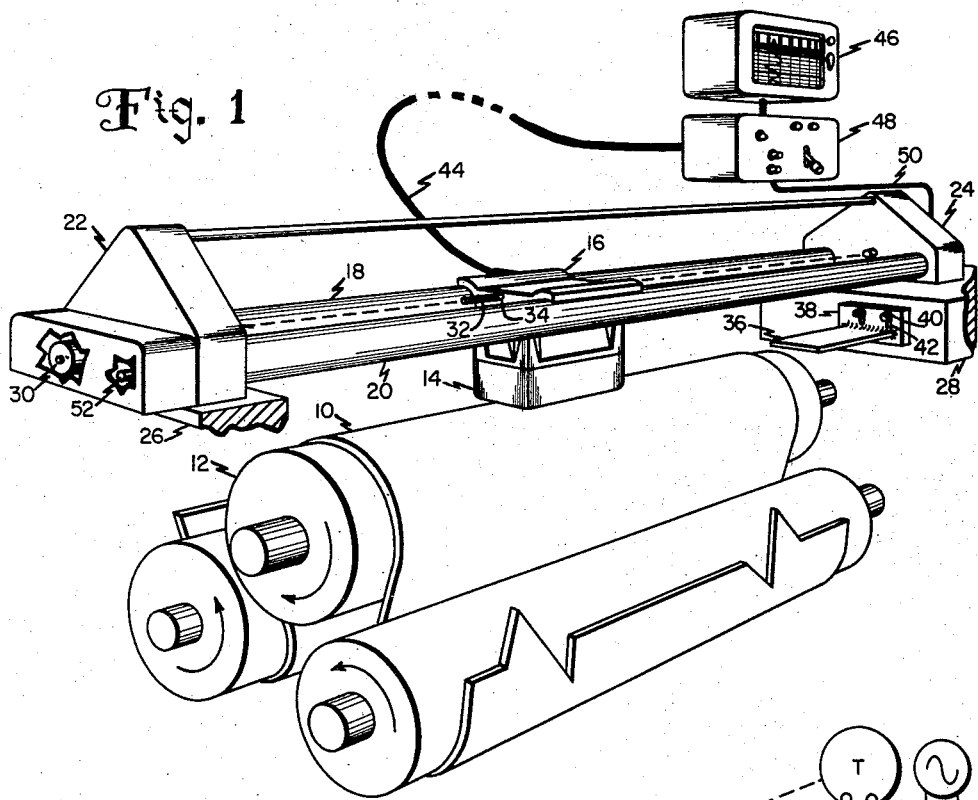
Figure 1 is a perspective showing of the general structure and application of an industrial type nuclear radiation reflection gauge as an illustrative apparatus wherein the present invention has utility.

Referring to Figure 1 there is shown a type of industrial radiation reflection gauge which may incorporate the cascade standardization system of the present invention. In this instance the gauge is employed to measure the weight per unit area of a material 10 illustrated as a traveling sheet of paper passing over a drier roll 12. The gauge comprises an inspection head 14 containing a suitable nuclear radiation source and a radiation detector; the head 14 being supported over the roll 12 and in measuring relation thereto by means of a carriage 16 which includes bearing means for permitting traversing movement of the head 14 parallel to the roll 12 along the length of the guide tubes 18 and 20. The tubes 18 and 20 are clamped in suitable end frames 22 and 24 which may be mounted on suitable support members indicated at 26 and 28, constructed or adapted to bear the weight of the gauging device and maintain the same in rigid alignment with the roll 12. Traversing movement of the head 14 across the width of the sheet 10 is actuated when required by means of an electric motor 30 which drives the head through suitable mechanical coupling means including a drive chain 32 attached as at 34 to the traversing carriage 16. Suitable sprockets (not shown) within the end housings 22 and 24 allow the motor driven drive chain 32 to be returned through one of the hollow tubes 18 or 20 to the opposite end of the supporting frame and attached to the opposite end of the traversing carriage in the same manner in which it is attached at 34. In this fashion the head 14 may be driven to any desired measuring point across the width of the sheet 10. The frame extends a sufficient distance beyond the end of the roll 12 in the direction of the housing 24 so that the head 14 may also be driven to an off sheet position over a standardizing plate 36. The plate 36 is preferably constructed of polished stainless steel, and may be fastened to a suitable bracket 38 adjustably secured to the fixed support member 28 by bolts as at 40 passing through slots as at 42 in the bracket 38 whereby the vertical spacing of the plate 36 may be adjusted with respect to the off sheet position of the head 14 in order to obtain an optimum air gap distance between the plate 36 and the head 14 when the latter is in the off sheet position. The plate 36 provides the standard reflecting surface upon which the gauge is periodically standardized. Under normal conditions, a daily dusting or wiping of the stainless steel surface and an occasional and thorough washing thereof with a cloth and suitable solvent is all that is required to maintain the standard reflector in condition. However, in many instances it has been found that a very dirty environment, wherein airborne particles or spattered liquids are apt to collect on the plate, requires the use of an automatic cover which may or may not include an automatic wiper for the plate. One such device (not shown) which has been employed by applicants, but not considered a part of the present invention, consists of a dust cover normally positioned over the standardizing plate and which is automatically withdrawn by an air cylinder controlled by an electrical switch triggered when the head 14 approaches the off sheet position.

The head 14 is flexibly connected by means of a multi-conductor cable 44 to an indicating and continuous recording instrument 46 and a control unit 48 which is also connected via conduited cables 50 to the head positioning mechanism and traversing drive motor 30. The housing 22 containing the drive motor 30 may also contain a helical wound multiturn potentiometer 52 whose shaft is driven by the traversing mechanism in order to provide an electrical signal representing the lateral position of the head 14 in a manner to be described hereinafter.

Figure 2:
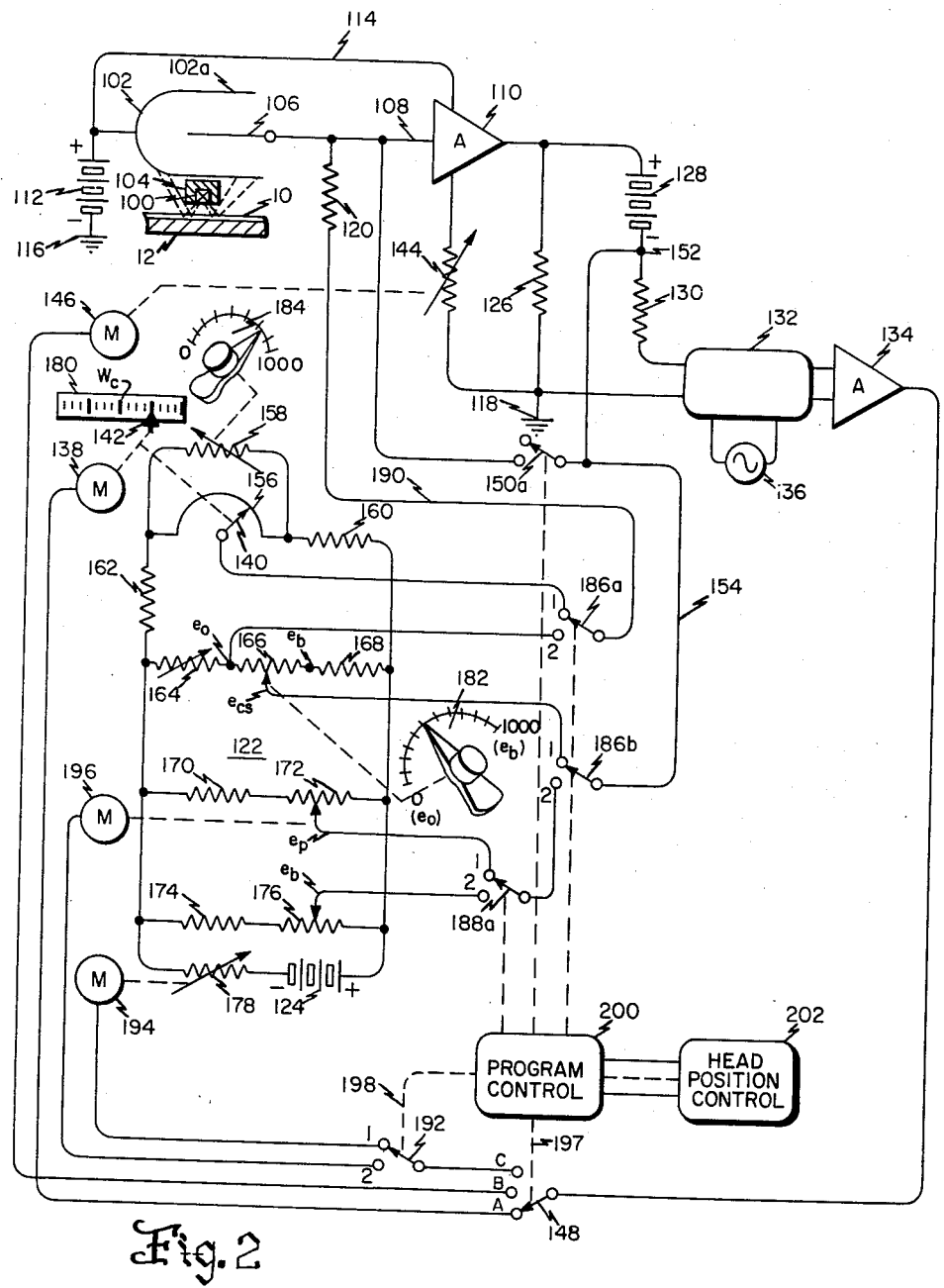
Figure 2 is a simplified electrical schematic diagram showing preferred circuitry whereby the cascade standardization method of this invention may be incorporated in the apparatus of Figure 1.

Figure 2 is a simplified schematic diagram illustrating the basic circuitry of a preferred form of the present invention as it may be applied to a measuring system suitable for use in the type of gauging apparatus shown in Figure 1. Herein a radiation source 100 comprising a hermetically sealed capsule containing a radioactive isotope emits radiation in the direction of the measured material 10 supported on the backer 12. These materials return a portion of the incident radiation in modified form to the detector 102 which is shielded against direct radiation from the source 100 by the thick shielding walls of the source holder 104 which has an opening in the direction of the material 10 to permit issuance of a useful radiation beam. The detector 102 is preferably an ionization chamber as depicted, having a conducting outer wall 102a to serve as its anode and a cathode 106 which is connected to the input terminal 108 of an impedance matching feedback amplifier 110.

The detector 102 and amplifier 110 are supplied with a suitable unidirectional voltage from a power source represented by the battery 112 through a B+ lead 114 and ground connections 116 and 118. By reason of this applied voltage, the ionization chamber passes a minute electrical current which is in magnitude proportional to the radiation intensity incident thereon. This current passes through a detector load resistor 120 of very high impedance, across which the detector current develops a proportional voltage which comprises the input signal to the electrical measuring system. Resistor 120 is connected to the input of the amplifier 110 in series opposition with a variable voltage source comprising a bridge network indicated generally at 122 and energized by a D.C. voltage represented by the battery 124. Hence the amplifier 110 responds to the difference between the signal voltage appearing across resistor 120 and the opposing voltage from the network 122.

The output circuit of amplifier 110 includes a cathode load resistor 126 which carries the current flowing in the output stage of the amplifier. This current flow produces a voltage drop across resistor 126 which is opposed by the potential across the battery 128 in a parallel circuit therewith. The parallel circuit includes a feedback resistor 130 and a chopper modulator 132 at the input of an A.C. servo amplifier 134. The chopper 132 is of the well-known type having vibrating switch contacts preferably driven at 60 c.p.s. from the conventional 115 v. A.C. power source 136. Whenever the voltage across load resistor 126 is not equal and opposite to the voltage across the battery 128 a current will flow through the feedback resistor 130 and the contacts of the chopper 132 which will thereupon deliver a 60 c.p.s. alternating signal to the input of the servo amplifier 134. The output of the amplifier 134 will have one of two directly opposite phases, depending on the polarity of the signal input to the chopper 132. In the normal measuring operation, the ouput of amplifier 134 drives a 2-phase servo motor 138 which actuates a slidewire potentiometer arm 140 in the bridge network 122 and at the same time operates the measuring indicator 142 of the recording instrument 46. In Figure 2 the output circuits of the servo amplifier 134 are merely indicated for simplicity and will be more completely described in connection with Figure 6. During measurement the position of the slidewire arm 140 determines the output voltage of the bridge network 122. Briefly, the servo operated slidewire device comprises an electro-mechanical feedback system which functions to maintain the input 108 of the impedance matching amplifier 110 at substantially zero or ground potential. That is to say, the input to amplifier 110 is the difference between the voltage developed across resistor 120 as a result of the detector current therethrough and the opposing voltage output of the bridge network 122. If these two voltages are not equal, the servo motor 138 is energized to move the slidewire arm 140 so as to readjust the magnitude of the opposing voltage, thereby to equalize the same with the signal voltage developed across resistor 120. In order to achieve this result, it is apparent that for no input to the amplifier 110, the amplifier 134 should have no output. In substance, this means that the amplifier 110 should have no output for no input. Accordingly, the input stage of amplifier 110 is provided with a variable cathode bias regulating means comprising a potentiometer 144 which may be servo adjusted by a "zero" motor 146 identical with the measuring pen motor 138. By throwing a switch 148 to position B, the output of the servo amplifier 134 may be disconnected from the pen motor 138 (switch position A) and connected to the zero motor 146. A clamp switch 150a is also provided, which when closed shorts out all input to the amplifier 110. Under these conditions the voltage developed across the cathode load resistor 126 as a result of current flow in the amplifier output stage should be substantially equal and opposite to the voltage of the battery 128. If this is not the case there will be a signal into the chopper 132 and the servo amplifier 134 will have an output, whereupon the motor 146 will drive potentiometer 144 in the proper direction to readjust the bias on the input stage of amplifier 110 in a manner such that the current flow through the output cathode resistor 126 is altered until the voltage thereacross becomes substantially equal and opposite to the voltage across the battery 128. At this time the current through the feedback resistor 130 and the chopper 132 is reduced essentially to zero, resulting in no output from the servo amplifier 134, whereupon the motor 146 driven thereby will stop at the balance point. "Zeroing" the amplifier in this manner constitutes one phase of standardization. Inasmuch as such standardization can be carried out only rather infrequently, for example, every half hour, the D.C. amplifier must be designed to operate with unusual zero stability, in spite of relatively large signal variations which may occur. This stability is achieved primarily by an electronic, substantially total inverse feedback arrangement in addition to the electro-mechanical feedback device employing the servo-operated slidewire. The electronic feedback is necessary in part because of the relatively slow response of the electro-mechanical arrangement, which may require a period of seconds to reach a point of balance. During this time large signals which could exist at the input of the D.C. amplifier 110 would have a tendency to overdrive the amplifier and produce deleterious effects on the stability thereof, causing permanent or semi-permanent changes in its operating characteristics. Accordingly, the input to the amplifier on lines 108 and 154 has no direct connection to ground 118 but rather line 154 is routed to ground through the feedback resistor 130 and the chopper 132. Therefore when the clamp switch 150a is open, allowing any existing signal voltage to be impressed on the input of amplifier 110, the presence of a signal will produce a change in the current flow through load resistor 126 so that the voltage developed thereacross will become smaller or larger than the voltage of the battery 128. As a result, a current will flow through the feedback resistor 130 and the chopper 132, and the point 152 will no longer be at ground potential but will assume a potential which is either positive or negative with respect thereto depending on the polarity of the input signal. This voltage is fed back to the amplifier input terminal 108 through the bridge network 122 and the high resistance 120, and will practically instantaneously assume a value almost equal and opposite to the applied signal so that the input terminal 108 remains at substantially ground potential. It can be seen that the input to amplifier 110 consists of the sum of three voltages; the signal across the high resistance 120, the opposing voltage from the network 122, and the feedback voltage across resistor 130 which automatically and instantaneously assumes a value such that the net input is very nearly zero at all times. That is, assuming a gain of 100 for the amplifier 110, the negative feedback will cancel about 99 percent of any existing difference between the signal appearing across resistor 120 and the output of the bridge network 122. This difference of course will normally be reduced nearly to zero but at a much slower rate by the action of the servo-operated slidewire.

Basically, the network 122 comprises a bridge circuit having an upper arm which includes the parallel combination of slidewire potentiometer 156 together with a variable resistance 158 and a pair of matched end resistors 160 and 162, and a lower arm which includes potentiometers 164 and 166. A resistor 168 is included in conjunction with potentiometer 166 for a purpose to be described. Two auxiliary arms of the bridge are formed by resistor 170 and potentiometer 172 and resistor 174 and potentiometer 176 respectively. The network is energized from a D.C. voltage source represented by the battery 124, and the voltage available across the bridge is variable by means of potentiometer 178. The bridge is initially balanced by an adjustment of potentiometer 164 so that the potential $e_0$ at the junction point of potentiometers 164 and 166 is the same as the potential derived from the arm 140 of the slidewire 156 when the arm 140 is located at its center of travel and the indicator 142 is located at the center point $W_c$ of its associated scale 180. Henceforth the potential $e_0$ serves as the reference point for the voltage output from the network 122. In the normal measuring operation, this output is made up of two components—a voltage $e_{cs}$ consisting of the voltage drop across that portion of potentiometer 166 between the adjustable arm thereof and the point $e_0$, and a second component of voltage which appears whenever the arm 140 of the slidewire deviates from the center position at which the bridge is balanced. The magnitude and polarity of this second voltage component depends on the distance and direction the slidewire arm 140 is moved from its center position, thus either adding to or subtracting from the magnitude of $e_{cs}$ to determine the net output of network 122.

Figure 3:
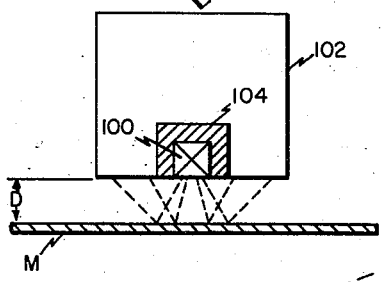
Figure 3 is a sketch of the physical relationship of the source/detector to a measured material in the apparatus of Figure 1.

The role of network 122 in measurement and standardization is more easily understood in view of the basic characteristics of a radiation reflection gauging device. Referring to Figure 3, a material M is shown at a fixed distance D from a source detector of the type incorporated in the inspection head 14 of Figure 1. The large graph of Figure 4 having its origin of axes at $e_0$ shows three curves relating detector response to various thicknesses (in weight per unit area; e.g., milligrams per square centimeter) of three illustrative materials M. Detector response values are given in terms of voltages $E_{dev}$ appearing across the detector load resistor 120 of Figure 2. It will be noted that when there is no material M (zero thickness) presented to the detector, the response is not zero but will have some value $e_x$ due to various factors such as scattered radiation or radiation reflected from air in front of the detector. As increasing thicknesses of material are placed in front of the detector, the response increases until for some indeterminate thickness in the neighborhood of $W_I$ it reaches an asymtotic maximum beyond which additional material weight produces no change in response. The relative response from different materials M is largely dependent on the average atomic number of the chemical elements present in the material. Thus the material 10 is illustrated as a paper or plastic material comprising hydrocarbons and having a relatively low response curve $M_{10}$. The backer 12 is illustrated as a metal having a higher response curve $M_{12}$. The material comprising the standardizing plate 36 is illustrated as having a still higher response curve $M_{36}$ for convenience of description only, since in practice the reflectivity of this surface may be somewhat higher, lower, or the same as that of the backer 12.

The small graph which is superimposed on the large graph in Figure 4 illustrates the effect of placing increasing thicknesses of material 10 over the backer 12. With no material 10 over the backer 12 the detector response is equal to the maximum ordinate of the curve $M_{12}$, whereas with some "infinite thickness" of material 10 over the backer the response is lowered to the asymptotic minimum equivalent to the maximum ordinate of the curve $M_{10}$. For intermediate thicknesses the response values are typically as illustrated by the curve $e_w$. In obtaining the data for curves as illustrated in Figure 4, the detector response value is measured indirectly by determining the magnitude of the opposing voltage from the network 122 which is required to cancel the voltage $E_{dev}$ which appears across the high resistance detector load 120. Hence on the graph of Figure 4 the negative sign is affixed to those voltage values which are also indicated at various points in the network 122 of Figure 2. Inasmuch as the absolute values obtained for $E_{dev}$ are subject to change; as a result, for example, of decay of the radioactive source, the ordinates of the curve $e_w$ are established in arbitrary units which are increments of $e_b$, the response from the normal backer $M_{12}$; in this case the surface of the roll 12 in Figure 1. This is accomplished by providing the precision potentiometer 166 (Figure 2) with a graduated dial 182 which divides the total potentiometer resistance into a number (usually 1000) of equal units. Thus if the dial 182 is turned fully clockwise to the numeral 1000 the adjustable tap of potentiometer 166 is essentially connected to the point indicated at $e_b$, so that the voltage $e_{cs}$ is at a maximum with respect to $e_o$. This maximum voltage $e_{cs}$ can be made equal to the voltage $e_b$, the response from the normal backer, by adjusting the total voltage across the bridge network 122 by means of potentiometer 178. The ordinates of the curve $e_w$ may now be obtained directly from the dial 182 by placing materials 10 of known thickness over the backer 12 and adjusting dial 182 until the indicator 142 is driven to the center of the scale 180. At this time the potential at the arm 140 of slidewire 156 is equal to $e_o$, and the net output of network 122 which now balances $E_{dev}$ across resistor 120 is obtained exclusively as a result of the voltage drop across potentiometer 166 between the adjustable arm thereof and the point $e_o$. The magnitude of this voltage in terms of ($e_b=1000$) is indicated by the position of the dial 182. Once established by the method outlined above, all relationships typified in Figure 4 will remain constant in spite of variable factors such as radioactive source decay, changes in the resistance 120, changes in the voltages of batteries 112 or 124, etc., provided that the geometry of the source-detector and its relationship to the backer 12 remains constant or suitably compensated, and provided that the condition of no output from amplifier 134 for no input to amplifier 110 is fulfilled. Accordingly, the gauge may be permanently calibrated, requiring only that periodic standardization be carried out to restore the correct value of $e_b$ from the network 122. For a more detailed explanation of this concept, reference is made to a co-pending application Serial No. 286,220, filed May 5, 1952, by Henry R. Chope, now U.S. Patent No. 2,829,268.

Referring to Figure 5, it is apparent that any weight $W_c$ may be chosen to produce an indicator reading at the center of the scale 180 of Figure 2 by setting the dial 182 to the corresponding number $e_c$ from the curve $e_w$. Thereafter if the instrument is measuring a sheet of material 10 having a weight per unit area $W_c$, the pointer 142 will indicate $W_c$ in the center of the scale 180. If the sheet weight deviates from $W_c$, the indicator 142 will be deflected to the right or left of center depending on whether the sheet is heavier or lighter respectively. The extent of the indicator deviation for a given weight deviation depends on the desired sensitivity, as set on potentiometer 158 which is in parallel with the slidewire resistance 156. Potentiometer 158 determines the portion of the total bridge voltage which is available across the slidewire 156, the remainder appearing across resistors 160 and 162. Thus if the resistance 158 is of low value, the voltage drop across the slidewire is low, the slidewire arm 140 must be deflected a large distance from its center position in order to balance out a given amount of change in $E_{dev}$ developed across resistor 120, and the gauge accordingly operates with high sensitivity. The converse is true for a high value of resistance 158. Potentiometer 158 may also be equipped with a graduated dial 184 similar to the dial 182 so that the instrument operator may conveniently select any desired measuring range by setting the two dials in accordance with a table of ranges derived in the calibration of the instrument.

In order to effect standardization without disturbing the correlation of the operating dial settings with given weight ranges, the two auxiliary arms of the bridge network 122 are provided in conjunction with switching means 186a, 186b and 188a. Proper standardization of the network 122 requires only that the maximum value of $e_{cs}$, obtained when dial 182 is set to 1000, should be equal to $E_{dev}$ when the head 14 of Figure 1 is positioned over the bare roll 12, at which time $E_{dev}$ has the absolute value $e_b$. This result may be achieved without resetting the dial 182 if the variable arm of potentiometer 176 has been pre-adjusted to a potential which is the same as that derived from the variable arm of potentiometer 166 when the dial 182 is set to 1000. Thus if the switches 186a, 186b and 188a are thrown to position No. 2, the output of the network 122 applied to lines 154 and 190 is ($e_b-e_o=e_b$). That is to say, line 190 from the detector load resistor 120 is connected through switch 186a to the junction of potentiometers 164 and 166 thus eliminating any potential due to a possible off-center position of the slidewire arm 140. Line 154 is connected through switches 186b and 188a to the variable arm of potentiometer 176 which is at the same potential which would exist at the variable arm of potentiometer 166 if the dial 182 were set to 1000. If this potential $e_b$ is not the same as $E_{dev}$ with the head positioned over the bare roll, it may be equalized therewith by adjusting potentiometer 178 which determines the total voltage across the bridge network 122. It is seen that if the output of the servo amplifier 134 is connected to the servo motor 194 through switches 148 and 192, this adjustment is performed automatically. The gauge is now properly standardized. However, as stated hereinabove, the bare roll is normally covered by the sheet 10 and will be unavailable for routine standardization. In order that the gauge may be standardized over the plate 36 in accordance with this invention the value of $e_p$ must now be established relative to the corrected value of $e_b$ in order that $e_b$ may be subsequently determined indirectly from observations of the value of $e_p$. Accordingly the head 14 is immediately positioned over the standardizing plate 36, switch 188a is placed in position No. 1, and the output of amplifier 134 is connected to servo motor 196, which will drive the arm of potentiometer 172 until the voltage $e_p$ thereon is equal to $E_{dev}$. Note that resistor 168 should be provided in conjunction with potentiometer 166 in the event that $e_p$ is larger than $e_b$. Potentiometer 172 remains at a fixed setting during normal operation and routine standardization of the gauge, and is readjusted if necessary only at such times as it is possible to make the reflectivity comparison between the roll and the plate.

Routine standardization of the network 122 is effected by throwing switches 186a and 186b to position No. 2, switch 188a to position No. 1, switch 148 to position C, and switch 192 to position No. 1. With the head 14 positioned over the standardizing plate, the motor 194 will readjust potentiometer 178 until the voltage $e_p$ at the arm of potentiometer 172 is equal to $E_{dev}$. This automatically restores the correct value of $e_b$, and fulfills the requirements of standardization.

It is appropriate now to briefly review the adjustments and switching operations required to establish and maintain the accuracy of the instrument. The arm 140 is positioned in the center of the slidewire 156 and the indicator 142 which is mechanically coupled to the arm 140 is positioned in the center $W_c$ of the scale 180. The bridge is balanced by a manual adjustment of potentiometer 164 to establish the point $e_o$ at the same potential as the arm 140. The dial 182 is set to 1000 to provide a maximum value of $e_{cs}$ from the arm of potentiometer 166. By manual means, potentiometer 176 is adjusted to the point where the potential at its arm is equal to this maximum $e_{cs}$. Switch 150a is closed, shorting out all input to amplifier 110. The output of servo amplifier 134 is connected to switch 148, position B, to servo motor 146, which will automatically adjust the bias on amplifier 110 until the servo amplifier (134) output is reduced to zero for no input to amplifier 110. The inspection head 14 is positioned over the bare roll 12. Switches 186a, 186b and 188a are placed in position No. 2. Switch 148 is placed in position C and switch 192 is placed in position No. 1, thereby connecting the output of servo amplifier 134 to the motor 194. On re-opening switch 150a, the servo motor 194 will drive potentiometer 178 until the value of $e_b$ is correct. Switch 150a is closed again, and after positioning the inspection head 14 over the standardizing plate 36 switch 188a is thrown to position No. 1 and switch 192 is thrown to position No. 2. On re-opening switch 150a, the motor 196 will drive potentiometer 172 until the value of $e_p$ is correct, whereupon switch 150a is re-closed. When the sheet 10 is passing over the roll 12, the gauge is positioned over the sheet, switches 186a, 186b and 188a are located in position No. 1, and switch 148 is placed in position A. On re-opening switch 150a, the gauge will measure the sheet in accordance with the setting of the range dials 182 and 184, at which time the pen servo motor 138 continuously repositions the slide-wire arm 140 and the indicator 142.

The switching functions above described may be performed by the program control device 200. In combination with the head positioning control system indicated at 202, the device 200 may cause the standardization functions to be carried out in a semi-automatic or completely automatic manner.

Figure 6:
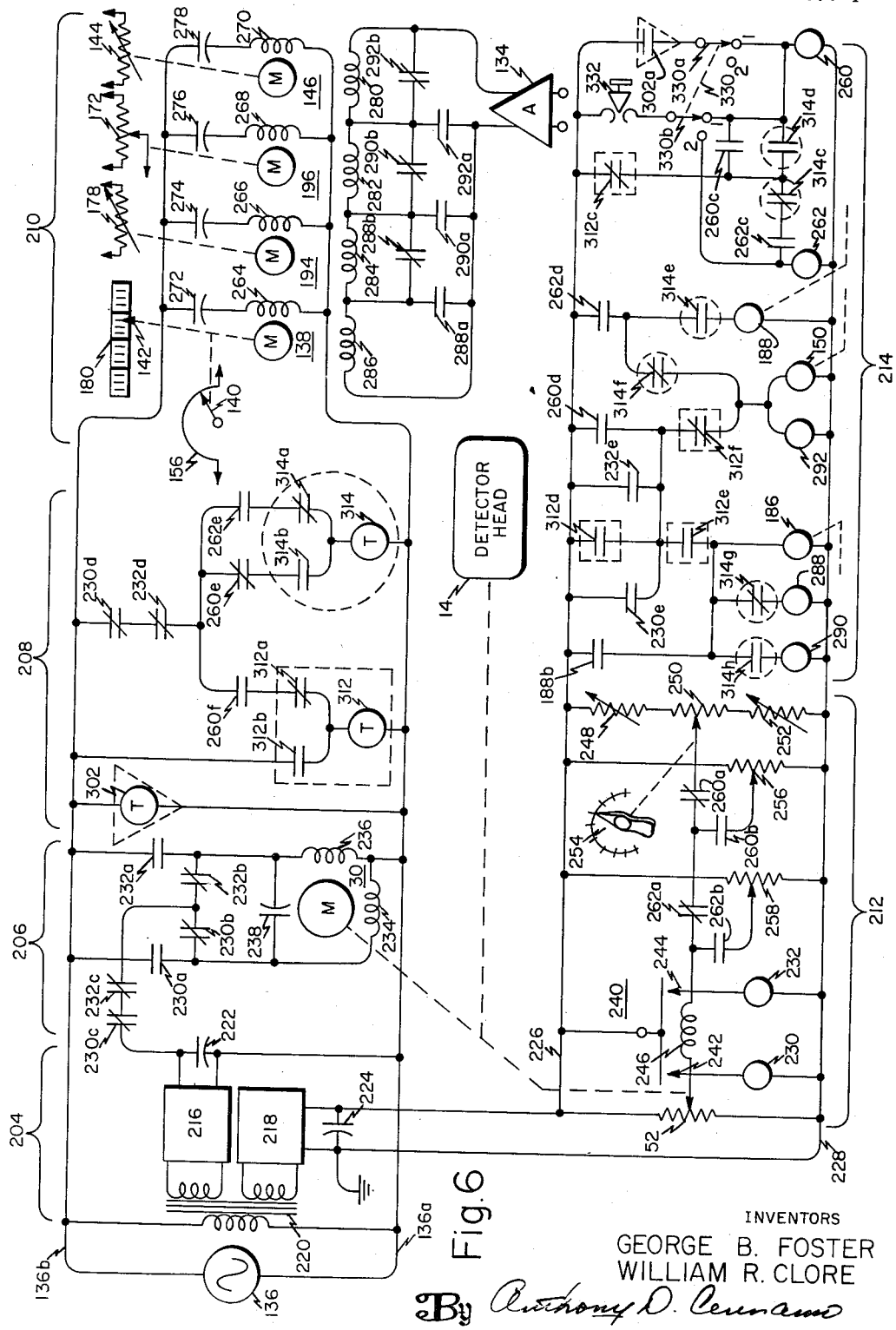
Figure 6 is a circuit diagram showing how the cascade standardization operations may be effected automatically.

Figure 6 is a schematic diagram showing in detail the program control and head positioning apparatus indicated at 200 and 202 in Figure 2 as well as more completely illustrating the circuits whereby the output of servo amplifier 134 is selectively applied to drive the several servo motors. These circuits are energized from the 115 v. A.C. 60 cycle power source 136 and include a D.C. power supply section 204, control circuits 206 for the traversing drive motor 30, program timers 208, servo motor control circuits 210, automatic head positioning control 212, and a relay section 214 which in conjunction with the timers 208 performs all switching functions including those indicated in Figure 2.

The power supply section 204 comprises a pair of bridge rectifiers 216 and 218 which are energized by the transformer 220. The D.C. output of rectifier 216 is filtered by capacitor 222 and used to provide dynamic braking of the traversing drive motor 30. The output of rectifier 218 is filtered by capacitor 224 and furnishes a D.C. voltage on lines 226 and 228 for operating the position control 212 and the relays in section 214.

Referring to section 206, the traversing drive motor 30 is controlled by a pair of multi-contact relays 230 and 232. The two-phase capacitor run motor 30 is equipped with a pair of field windings 234 and 236 having a common connection to line 136a of the power source 136. When the motor is not energized to drive the detector head 14, a D.C. voltage from rectifier 216 is applied across both windings through normally closed contacts 230c, 232c, 230b and 232b. Operation of either relay will disconnect this braking voltage by opening contacts 230c or 232c. Operation of relay 230 will close contacts 230a and open contacts 230b. Line 136b will be connected to winding 234 directly and to winding 236 through capacitor 238, which is of a size to produce a 90-degree phase shift in the voltage applied across winding 236, and accordingly the motor 30 will drive the detector head 14 in one direction. On operation of relay 232, contacts 232b will open, contacts 232a will connect line 136b to winding 236 directly and to winding 234 through phasing capacitor 238, causing the motor to drive the head 14 in the opposite direction.

The relays 230 and 232 which control the traversing motor 30 are in turn controlled by the automatic positioning device 212, wherein the relay coils are indicated by the numerals 230 and 232. When energized one or the other of the relay coils receives power from lines 226 and 228 through one contact of a sensitive polarized relay 240. The polarized relay has a pair of normally open contacts 242 and 244, one of which will close if there is a voltage across the coil 246, the polarity of the impressed voltage determining which particular contact is operative. The relay coil 246 is connected as the center arm of a bridge circuit having a traversing potentiometer 52 in one branch and three potentiometers 248, 250 and 252 in the other branch, the two branches comprising voltage dividers across the D.C. lines 226 and 228. The arm of the traversing potentiometer 52 is mechanically coupled to the drive mechanism associated with the traversing motor 30 which moves the detector head 14, so that the potential at the left end of the polarized relay coil 246 represents the lateral position of the detector head. The arm of potentiometer 250 is coupled to the dial 254 which may be located on the control unit 48 and used by the gauge operator to set the desired measuring position of the head 14. Thus the potential at the arm of potentiometer 250 which is impressed on the right end of the polarized relay coil 246 represents the desired measuring position. Whenever there is a difference between the actual position and the desired position of the head 14, an error voltage will appear across the coil 246 of the polarized relay 240, causing one of the contacts 242 or 244 to close, depending on the direction of the positional error. Accordingly, one of the traversing motor control relays 230 or 232 will be energized, causing the motor 30 to drive the head 14 and potentiometer 52 in a direction to reduce the positional error. As the positional error approaches zero, the voltage unbalance across coil 246 will also approach zero, whereupon the contact 242 or 244 which was closed will open, de-energizing relay 230 or 232 which was operated, in turn removing power from motor 30 and applying braking voltage thereto so that movement of the detector head will quickly cease. It can be seen that potentiometers 248 and 252 provide a means for calibrating the dial 254 so that the graduations thereon may coincide with specific positions of the head 14 relative to the roll 12.

Two additional potentiometers 256 and 258, each also comprising a voltage divider across lines 226 and 228, are employed to automatically locate two pre-determined special positions of the head 14. The adjustable tap of potentiometer 256 is pre-set to deliver a potential representing the off sheet position of the head 14 over the standardizing plate 36, and potentiometer 258 similarly presents a potential representing a pre-determined position of the head for appropriately standardizing over the roll 12. Relays 260 and 262 are employed to perform the switching required to cause the head 14 to be driven automatically to one of these special positions. Thus if relay 260 is energized its contacts 260a will disconnect the coil 246 of the polarized relay from potentiometer 250 and contacts 260b will connect it to the arm of the off sheet potentiometer 256. Similarly if relay 262 is energized its contacts 262a and 262b will disconnect the coil from either potentiometer 250 or 256 and connect the same to the roll standardize position potentiometer 258.

Referring now to section 210 which contains the four servo motors indicated in Figure 2, it is seen that each motor has a phase winding 264–270 in series with a phasing capacitor 272–278 across the leads of the 60 c.p.s. power source 136. The capacitors establish the voltage across the phase windings in suitable phase relationship to the line voltage and the output of the servo amplifier 134 which is phase dependent thereon due to the action of the chopper 132 of Figure 2. The sense windings 280–286 of the servo motors are connected across the output terminals of the servo amplifier 134 in quasi-series relationship, and receive power therefrom according to the mutual condition of three relays 288–292 which establish a sort of hierarchy among the four motors. Thus if the relays 288–292 are denergized as shown, their normally closed contacts 288b, 290b and 292b short-circuit windings 280–284 so that the amplifier output is applied across the sense winding 286 of the pen servo motor 138 which drives the slidewire arm 140 and the measuring indicator 142. If the plate motor relay 288 is energized, its contacts 288a short-circuit winding 286 of the pen servo motor, while the opening of contacts 288b allows the output of the amplifier to energize winding 284 of the plate standardize servo motor 194 which adjusts the voltage across the bridge network 122 of Figure 2 by adjusting potentiometer 178. Similarly the contacts 290a and 290b will short circuit windings 284 and 286 and allow power to be applied to winding 282 of the roll standardize servo motor 196 which sets the value of $e_p$ with respect to the corrected value of $e_b$ by adjusting potentiometer 172, regardless of the condition of relay 288. It follows that the zero servo motor 146 and its associated relay 292 have precedence over all others, so that if contacts 292a are closed and contacts 292b are open the servo amplifier output is connected across the zero motor sense winding 280 and the remaining group 282–286 of windings is short-circuited regardless of the condition of relays 288 and 290. The motor 146 re-sets the bias of amplifier 110 by adjusting potentiometer 144. It will be recalled that the output of the servo amplifier 134 applied across one of the motor sense windings 280–286 will have one of two directly opposite phases, each of which will be in 90-degree phase relation to the voltage across the phase windings 264–270, so that the direction of motor rotation is dependent on the phase of the servo amplifier output.

Referring to the timer section 208, the numeral 302 indicates a synchronous motor driven timer which is energized by the line voltage across leads 136a and 136b. The purpose of this timer is to initiate the automatic plate standardization at suitable intervals, for example, every half hour, by momentarily closing a set of contacts 302a shown in the relay section 214 and enclosed by dotted lines forming a triangle to facilitate identification. The arrangement of the timer is shown in Figure 7, wherein it is seen that synchronous motor 302 drives a cam 304 which actuates the arm 306 of a snap-action switch 302a. During each revolution of the cam 304, the switch 302a will be closed for a short interval when the notch 308 of the cam 304 is under the cam follower 310 attached to the arm 306 of the switch 302a.

Figure 8:
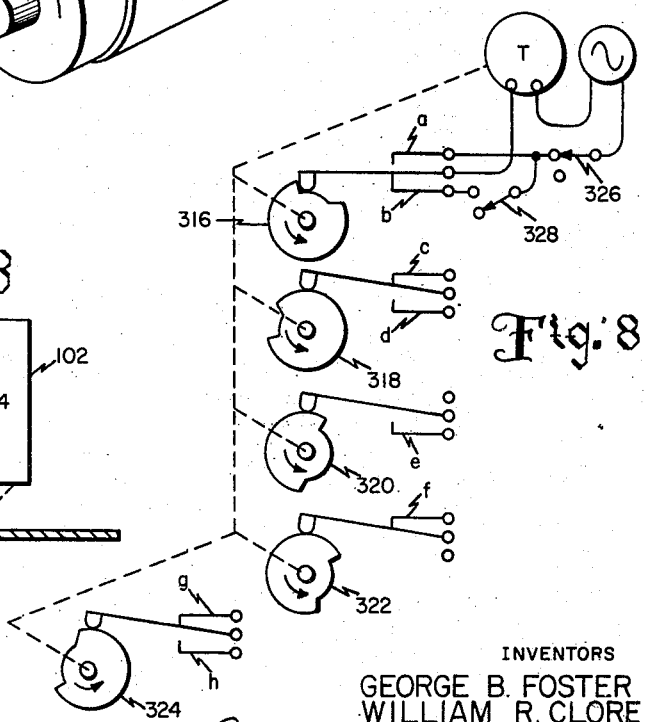
Figure 8 shows the arrangement of the program timers utilized in the system of Figure 6.

Section 208 of Figure 6 also includes a pair of timers 312 and 314 whose arrangement is shown in Figure 8. A synchronous motor T drives cams 316–324 which operate a set of snap-action switches having contacts a–h. Each timer is arranged to carry out a predetermined switching cycle during a time period of approximately one minute which is required for the cams 316–324 to make one complete revolution. The two timers are essentially identical, except that switch contacts g and h are not used on timer 312. The motor T is energized from the conventional 60-cycle power source 136 through contacts of a normally closed switch 326. The cam 316 and associated switch contacts a and b are arranged to automatically hold the motor energized for one cam revolution after the motor T is started by closing a switch 328 for a short interval. Thus if switch 328 is closed the motor T will receive power through contacts b, rotating cam 316 until its associated cam follower operates the cam switch to open contacts b and complete a holding circuit through contacts a. Power will now remain on the motor T even though switch 328 is opened. After the motor T has run for one minute, the cam follower will again drop into the notch in cam 316, opening contacts a and closing contacts b. The motor will now be deenergized since the opening of switch 328 will have removed power from contacts b. During their one revolution, the cams 318–324 actuate a switching program as follows:

After a short interval contacts e close. Shortly thereafter contacts f are opened. After an interval determined by the width of the notch in cam 322, contacts f are re-closed. Shortly thereafter contacts e re-open. A few seconds later contacts g open and contacts h simultaneously close. Shortly thereafter contacts c open and contacts d simultaneously close. After an interval determined by the width of the notch in cam 318, contacts d re-open and contacts c simultaneously re-close. Shortly thereafter contacts h re-open and contacts g simultaneously re-close. Although the cycle is not completed until the cam 316 allows switch contacts a to open, the cycle may be interrupted and subsequently resumed at any time while contacts a are closed by opening and closing switch 326.

The above described timer functions are incorporated in the automatic standardization operations of which the following is a detailed explanation. To facilitate their identification, portions of the plate standardize timer 312 appearing in Figure 6 are enclosed in dotted rectangles. Similarly, portions of the roll standardize time 314 are enclosed in dotted circles. Referring to section 214 of Figure 6, there is shown a switch 330 which is normally in position No. 1 as shown, preventing the gauge from standardizing over the roll 12 and allowing routine standardization to occur over the plate 36. With switch 330 in position No. 1, either a manually controlled push button switch 332 or the contacts 302a of the half-hour timer 302 may initiate the plate standardization sequence by energizing the plate standardize relay 260. Contacts 260c close, establishing a holding circuit through contacts 312c and 260c, so that power will remain on the coil 260 even though the push button 232 is released or the timer contacts 302a are opened soon thereafter. The clamp relay 150 is now energized through contacts 312f and contacts 260d of the plate standardize relay 260. Contacts 150a (shown in Figure 2) short circuit the input to the feedback amplifier 110. This operation will be hereinafter referred to as "clamping." The zero motor relay 292 is energized in parallel with relay 150. Its contacts 292a and 292b short circuit the sense windings 282–286 of the servo motors 138, 194 and 196 and apply the output of the servo amplifier 134 across the sense winding 280 of the zero motor 146. This motor will now adjust the bias on the input of the feedback amplifier 110. This operation will be hereinafter referred to as "zeroing." Meanwhile in section 212 contacts 260a and 260b of the plate standardize relay transfer the right end of the coil 246 of the polarized relay 240 from the measuring position potentiometer 250 to the off sheet position potentiometer 256, causing the out traversing relay 232 to be energized, in turn causing the traversing motor 30 to drive the head 14 off sheet toward the standardizing plate 36 in the manner hereinabove described. Meanwhile in section 208 connections are established to energize the plate timer 312 through its own contact 312a, contacts 260f of the plate standardize relay which have now closed, contacts 232d and contacts 230d. However, contacts 232d of the out traversing relay 232 are open while the head 14 is traversing, so that timer 312 is not actually energized until the head 14 reaches the off sheet position. At that time the polarized relay 240 is balanced, de-energizing relay 232; the head 14 stops in position over plate 36 and the timer 312 begins its cycle when contacts 232d close. In a moment the timer contacts 312b close the contacts 312a simultaneously open, so that the timer will be energized directly from line 136b and will complete its cycle regardless of further relay action. Shortly the timer contacts 312e in section 214 energize the source bias relay 186. This circuit is traced from line 226 through contacts 260d of the plate standardize relay now closed, contacts 312e, the coil 186 to line 228. The plate motor relay coil 288 is simultaneously energized in parallel with relay 186 through contacts 314g. In section 210 contacts 288a and 288b are operated, but this has no immediate effect since motor windings 282–286 are still short-circuited by contacts 292a. Since relay 150 is still energized the gauge continues to "clamp and zero." In Figure 2, contacts 188a are in position No. 1 and contacts 186a and 186b of relay 186 are now in position No. 2 in readiness for plate standardization, which begins when (see Figure 6) relays 150 and 292 are de-energized by the opening of time contacts 312f. De-energizing relay 150 allows contacts 150a (Figure 2) to unclamp the feedback amplifier. De-energizing relay 292 allows its contacts 292b to reclose and contacts 292a to re-open. Since relay 288 is energized, its contacts 288a are closed and its contacts 288b are open, the output of servo amplifier 134 is now applied across the sense winding 284 of the plate servo motor 194, which now readjusts potentiometer 178 (see Figure 2). After an interval sufficient to complete the adjustment, the timer contacts 312f in section 214, Figure 6, reclose, again energizing relays 150 and 292, whereupon the gauge re-commences clamping and zeroing as before. Shortly thereafter relays 186 and 288 are deenergized when timer contacts 312e re-open. The standardization cycle terminates when the timer contacts 312d close and contacts 312c simultaneously open. Contacts 312c break the holding circuit which held the plate standardize relay 260 energized after the half-hour timer contacts 302a re-opened. Contacts 312d maintain the clamp and zero relays 150 and 292 energized when contacts 260d open. Contacts 260a and 260b transfer the right end of the polarized relay coil 246 back to the measuring position potentiometer 250, causing the head 14 to be returned to measuring position by energizing the in relay 230. Timer contacts 312d soon re-open and contacts 312c reclose. Since contacts 230e of the in relay, in parallel with contacts 312d of the timer, are closed while the head 14 is traversing, the clamp and zero relays 150 and 292 will remain energized until the head 14 stops in measuring position when relay 230 is de-energized. Thereupon the gauge ceases to clamp and zero and resumes measurement as before. Upon completion of one revolution of its cams, the timer 312 is de-energized when its contacts 312a and 312b return to normally open and closed positions respectively. The above described plate standardization sequence is automatically repeated each time the standardization cycle is initiated by the timer 302, insuring that the gauge will continue to measure and record the process accurately and automatically without any special attention.

At infrequent and generally irregular intervals there occurs an opportunity to recheck the instrument settings in relation to the reflectivity of the roll 12 when the sheet 10 is not present thereon. Roll standardization is initiated by throwing the switch 330 to position No. 2 and operating the pushbutton switch 332. If desired, this initiation may be effected automatically through operation of a sheet break detector device which is commonly used, for example, on paper machines. The sheet break detector may take the form of a photo-electric device which monitors the presence of the sheet 10 over the roll 12 and operates relays whose contacts are substituted for the switches 330 and 332. In most cases these manual switches are adequate or preferable due to the infrequency of roll standardizations required and/or in the event that such completely automatic functioning might interfere with emergency rethreading operations on the machine.

With the roll-plate selector switch 330 in position No. 2, the half-hour timer is ineffective, since contacts 330a open the circuit through the timer contacts 302a. When pushbutton 332 is pressed to initiate roll standardization, the roll standardize relay 262 is energized. Its contacts 262c establish a holding circuit for the coil 262 through timer contacts 314c and 312c. Its contacts 262d energize the clamp and zero relays 150 and 292 through a circuit which is traced from line 226 through contacts 262d, timer contacts 314f, the relay coils 150 and 292 to line 228. Contacts 262a and 262b transfer the right end of the polarized relay coil 246 to the roll standardize position potentiometer 258. Contacts 262e in section 208 establish connections for energizing the roll timer 314 which, however, is not allowed to start its cycle until the head 14 reaches its roll standardize position, since contacts 230d or 232d are open while the gauge is traversing. Shortly after the timer starts, its contacts 314a open and contacts 314b simultaneously close, establishing a hold contact for the timer motor 314 through contacts 260e, 232d and 230d. Shortly thereafter the timer contacts 314e energize the standardize reference relay 188 in section 214. Contacts 188b will in turn energize the source bias relay 186, and through timer contacts 314g will also energize the plate motor relay 288. Thus, contacts 186a, 186b and 188a in Figure 2 are placed in No. 2 position, but this has no immediate effect since the clamp relay contacts 150a are closed. Also in section 210, Figure 6, contacts 288a and 288b respectively open and close but the gauge continues to "zero" because relay 292 is still energized. Anon the timer contacts 314f open, de-energizing the clamp and zero relays 150 and 292, allowing the gauge to unclamp and the plate motor 194 to readjust potentiometer 178, thus properly standardizing the gauge over the roll surface. This re-adjustment is permitted to continue for a period of time determined by the width of the slot in cam 322 of timer 314, whereupon its contacts 314f reclose to resume clamping and zeroing as before. A few seconds later, timer contacts 314e open, de-energizing the standardize reference relay 188; whose contacts 188b in turn remove power from the source bias relay 186 and the plate motor relay 288. Shortly thereafter, the timer contacts 314g open and contacts 314h simultaneously close, thus connecting the roll motor relay 290, instead of the plate motor relay 288, in parallel with the source bias relay 186. A short time later, the timer contacts 314d close and contacts 314c open, energizing the plate standardize relay 260 and de-energizing the roll standardize relay 262. In section 208, since timer contacts 314a are open and contacts 314b are closed, the timer 314 has been receiving power through the normally closed contacts 260e of the plate standardize relay 260. Hence when this relay is energized and its contacts 260e open, the timer 314 will be interrupted in its cycle. The complete plate standardization sequence detailed hereinabove will now be repeated, except that the roll motor relay 290 will be substituted for the plate motor relay 288 in the sequence of operation. Accordingly, the roll servo motor 196 will operate instead of the plate servo motor 194, thus effecting the reflectivity comparison in the manner above described in connection with Figure 2. When the plate standardization cycle is completed with the de-energization of the plate standardize relay 260, its contacts 260e will re-energize the roll timer 314 so that the latter may complete its cycle which had been interrupted, restoring contacts 314g to their normally closed position and contacts 314h to their normally open position. Restoring switch 330 to its normal position No. 1 permits the gauge to resume its normal periodic plate standardization functions.

While the invention has been described and illustrated as a specific embodiment thereof in connection with a particular type of apparatus wherein it is evident that the objects of the invention have been fully accomplished, it is also evident that the principles of the invention may be utilized in many other applications and that many modifications of the disclosed apparatus are possible without departing from the spirit and the scope of the invention as is set forth in the appended claims.

What is claimed is:

1. In a system for gauging a property of a material from one side thereof by directing a beam of penetrative radiation into the material, receiving reflected radiation from said material incident on a radiation detector adjacent the source of said radiation beam, developing in a circuit means associated with said detector a first voltage functional of a characteristic of said reflected radiation, opposing said first voltage with a second voltage from a calibrating network energized by an energizing voltage source, and representing the value of said material property on an indicating means responsive to the difference between said first and second voltages, means for compensating said system for error producing changes therein which comprises means connected in said calibrating network for providing a first reference voltage proportional to a known value of said material property, means for locating in measuring relation to said detector and radiation source a standard material surface having stable reflective characteristics independent of said material property being measured, means providing across a portion of said calibrating network a second reference voltage proportional to the response of said detector to said standard surface and variable proportionally with any change in said first reference voltage, and means for subsequently standardizing said system against said standard surface by adjusting said first reference voltage so as to restore the correct value of said second reference voltage.

2. Reflection gauging apparatus for measuring a property of a material from one side thereof, comprising an inspection head having a radioactive source mounted therein for providing a beam of penetrative radiation directed outwardly from said inspection head, a radiation detector also mounted in said inspection head responsive to a characteristic of radiation reflected from matter in the path of said radiation beam, circuit means connected to said detector for developing a first voltage functional of said reflected radiation incident on said detector; an opposing voltage source comprising a plurality of impedances forming a voltage divider, an energizing voltage source for energizing said voltage divider, a variable impedance intermediate said energizing voltage source and said voltage divider for regulating the potential across the same, a first terminal connected to a reference tap on one of said load impedances, at least three output taps on said voltage divider, at least two of said output taps being first and second potentiometer taps on said load impedances, a second terminal, a switch means having a first state connecting said second terminal to said first potentiometer tap, a second state connecting said second terminal to said second potentiometer tap and a third state connecting said second terminal to the remaining one of said three output taps; means for connecting said first and second terminals of said opposing voltage source in opposition to said first voltage; indicating means responsive to any difference between said first voltage and said opposing voltage, means for positioning said inspection head in measuring relation to said material for gauging a property of the same, a standard surface having substantially constant radiation reflectivity characteristics, means for withdrawing said inspection head from said material, and means for positioning said inspection head in measuring relation to said standard surface.

3. In a measuring instrument including a transducer reactive to a variable condition for generating a signal voltage functional of the value of said condition, a variable source of a comparison voltage and means energized by the difference between said signal voltage and said comparison voltage for indicating said variable condition value, cascade standardization means for said instrument comprising: means for adjusting the output of said comparison voltage source, a potentiometer energized by said output, a reference terminal for said output on said potentiometer, a first adjustable tap on said potentiometer for providing said comparison voltage, a standard output terminal on said potentiometer for providing a first reference voltage, a second adjustable tap on said potentiometer for providing a second reference voltage; primary standardization means including means for occasionally subjecting said transducer to a known value of said condition to provide a calibration reference value of said signal voltage, switch means for substituting said first reference voltage for said comparison voltage, and means for indicating equality between said first reference voltage and said reference value of said signal voltage; secondary standardization means including means for generating a standardization reference voltage, means for indicating equality between said standardization reference voltage and said second reference voltage, means for substituting said standardization reference voltage for said signal voltage, switch means for substituting said second reference voltage for said comparison voltage, and means for indicating equality between said second reference voltage and said standardization reference voltage.

4. A system for processing an analog voltage representing a variable quantity so as to register an error-free indication of said quantity despite the occurrence of datum displacements of said analog voltage relative to a normally inaccessible primary standard for said quantity, said system comprising a secondary standard for said quantity, means providing a first reference voltage having an initial proportional relationship to the value of said primary standard, means providing a second reference voltage, means for adjusting said second reference voltage to obtain said initial proportional relationship thereof to the value of said secondary standard, means for recording the ratio of said first and second reference voltages, means for measuring the difference between said analog voltage and said first reference voltage to provide said variable property indication, means for periodically comparing said secondary stanadrd with said second reference voltage to detect a change in said initial proportional relationship, means for readjusting the value of said second reference voltage to restore said initial proportional relationship, and means for readjusting the value of said first reference voltage to restore said recorded ratio.

5. A system for processing an analog voltage representing a variable quantity so as to register an error-free indication of said quantity despite the occurrence of datum displacements of said analog voltage relative to a normally inaccessible primary standard for said quantity, said system comprising a secondary standard for said quantity, a reference voltage source, means for adjusting the output of said reference voltage source; means for separating said output into a first reference voltage portion and a second reference voltage portion, said first portion having an initial proportional relationship to the value of said primary standard and said second portion having said initial proportional relationship to said secondary standard, means for measuring the difference between said analog voltage and said first reference voltage to provide said variable property indication, means for periodically comparing said secondary standard with said second reference voltage to detect a change in said initial proportional relationship, and means energized by said detected change for actuating said reference voltage source output adjusting means so as to restore said initial proportional relationship.

6. A system as in claim 5 wherein said secondary standard comprises means for generating a standard voltage, wherein said initial proportional relationship provides a one-to-one ratio of said standard voltage to said second reference voltage, wherein said comparing means to detect said change comprises a servo amplifier having an input receiving the difference between said standard voltage and said second reference voltage and an output providing motor-driving power for any voltage at said input, and wherein said actuating means comprises a servo motor driven by said amplifier output.

7. A measuring instrument comprising a transducer responsive to a variable condition for producing a first electrical voltage functional of the value of said condition; a source of a second voltage opposing said first voltage, said opposing voltage source comprising a plurality of load impedances forming a voltage divider, an energizing voltage source energizing said voltage divider, a variable impedance intermediate said energizing source and said voltage divider for regulating the potential across the same, a first terminal connected to a reference tap on one of said load impedances, at least three output taps on said voltage divider, at least two of said output taps being first and second potentiometer taps on said load impedances, a second terminal, a switch means having a first state connecting said second terminal to said first potentiometer tap, a second state connecting said second terminal to said second potentiometer tap and a third state connecting said second terminal to the remaining one of said three output taps; indicating means for registering the difference between said first and second voltages, thereby indicating the value of said condition, means for connecting said first and second terminals to said indicating means in opposition to said first electrical voltage; means for normally subjecting said transducer to said variable condition and for maintaining said switch means in said first state; means for generating a standard reference voltage; means for periodically and simultaneously substituting said standard voltage for said first voltage, actuating said switch means to said third state and adjusting said variable impedance so as to equalize said second voltage with said standard voltage; and means for occasionally and simultaneously subjecting said transducer to a known reference value of said variable condition, actuating said switch means to said second state, and adjusting said second potentiometer tap so as to equalize said second voltage with said first voltage.

References Cited in the file of this patent

UNITED STATES PATENTS

| | | |
|---|---|---|
| 2,264,725 | Shoupp et al. | Dec. 2, 1941 |
| 2,488,269 | Clapp | Nov. 15, 1949 |
| 2,618,751 | Fearnside et al. | Nov. 18, 1952 |
| 2,675,483 | Leighton et al. | Apr. 13, 1954 |
| 2,714,669 | Wuppermann | Aug. 2, 1955 |
| 2,750,986 | Russell et al. | June 19, 1956 |